United States Patent
Shimatani

(10) Patent No.: US 8,658,283 B2
(45) Date of Patent: Feb. 25, 2014

(54) LAMINATED GLASS FOR WINDOW AND GLASS WINDOW MEMBER

(75) Inventor: Narutoshi Shimatani, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 703 days.

(21) Appl. No.: 12/594,644

(22) PCT Filed: May 13, 2008

(86) PCT No.: PCT/JP2008/058777
§ 371 (c)(1), (2), (4) Date: Oct. 5, 2009

(87) PCT Pub. No.: WO2008/143063
PCT Pub. Date: Nov. 27, 2008

(65) Prior Publication Data
US 2010/0151210 A1    Jun. 17, 2010

(30) Foreign Application Priority Data
May 14, 2007 (JP) .................. 2007-127927

(51) Int. Cl.
*B32B 17/06* (2006.01)
*B32B 7/02* (2006.01)

(52) U.S. Cl.
USPC .................. 428/426; 428/215; 428/195.1

(58) Field of Classification Search
USPC ..................... 428/426, 195.1, 215
See application file for complete search history.

(56) References Cited

U.S. PATENT DOCUMENTS

| 4,277,538 A | * | 7/1981 | Beckmann et al. | 428/429 |
| 4,554,259 A | * | 11/1985 | Franklin et al. | 501/67 |
| 2006/0188730 A1 | * | 8/2006 | Varanasi et al. | 428/432 |
| 2009/0311497 A1 | * | 12/2009 | Aoki | 428/214 |

FOREIGN PATENT DOCUMENTS

| EP | 716339 A1 | * | 6/1996 |
| JP | 06-099547 | | 4/1994 |
| JP | 07-101755 | | 4/1995 |
| JP | 2001-227091 | | 8/2001 |
| JP | 2002-029776 | | 1/2002 |
| JP | 2002029776 A | * | 1/2002 |
| JP | 2002-087849 | | 3/2002 |
| JP | 2003-176159 | | 6/2003 |
| JP | 2006-096612 | | 4/2006 |
| WO | WO 2008032781 A1 | * | 3/2008 |

OTHER PUBLICATIONS

JP02002029776A Machine Translation.*
Machine Translation of JP 2002-029776A; Date Jan. 2002; Inventor: Miwa, Shinkichi.*
International Search Report dated Aug. 5, 2008 for International Application No. PCT/JP2008/058777.
International Preliminary Report on Patentability and Written Opinion of the International Searching Authority dated Dec. 3, 2009 in International (PCT) Application No. PCT/JP2008/058777.

* cited by examiner

*Primary Examiner* — Mark Ruthkosky
*Assistant Examiner* — Laura C Powers
(74) *Attorney, Agent, or Firm* — Wenderoth, Lind & Ponack, L.L.P.

(57) ABSTRACT

A laminated glass for windows has a multilayer structure, wherein plural sheets of glass are laminated through a resin layer. The sheet glasses are made of an alkali-free borosilicate glass. Each sheet glass has a thickness of 1 mm or less, and the total thickness of the sheet glasses is 2 to 10 mm.

13 Claims, 2 Drawing Sheets

LAMINATED GLASS FOR WINDOW AND GLASS WINDOW MEMBER

TECHNICAL FIELD

The present invention relates to a laminated glass for windows used as a window member for automobiles, various buildings, and the like, and a glass window member including a laminated glass for windows.

A sheet glass is used for various applications by virtue of its excellent properties such as light-transmitting property, smoothness, and airtightness. For example, a sheet glass provided with various properties has been used as a window sheet glass of various buildings and a windshield for automobiles, a light-transmitting window of a showcase for displaying various articles, a display window of electronic components, e.g., image display devices such as a liquid crystal display device and a plasma display, and a window member of various kinds of packages accommodating electronic components. Such various kinds of sheet glasses may be utilized as a laminated glass in which plural sheets of glass are laminated so as to compensate for the brittleness in terms of the strength of the sheet glass. The laminated glass exhibits excellent properties in terms of penetration resistance and strength, and hence the laminated glass has been used frequently as a window member for crime prevention. Therefore, a number of proposals have been made regarding a window member for crime prevention (such as break-in and burglary).

For example, Patent Document 1 discloses a laminated glass which uses a sheet glass made of borosilicate glass as a window sheet glass for crime prevention, and uses a copolymer of tetrafluoroethylene-hexafluoropropylene-vinylidene fluoride as an intermediate film to be placed between the sheet glasses. Further, Patent Document 2 discloses a laminated glass which has satisfactory shock resistance and penetration resistance and is excellent in crime prevention, in which two transparent substrates are laminated via a spacer placed around the periphery to form a laminated glass, and an organic resin film is laminated and attached to be integrated with a plate surface of one or both of the transparent substrates via an adhesive resin layer, whereby a film-reinforced substrate is obtained. Further, Patent Document 3 discloses a film-reinforced glass which is excellent in shock resistance, penetration resistance, and crime prevention, is also excellent in durability by virtue of satisfactory adhesion, moreover, is small in thickness, and can be produced easily. In this film-reinforced glass, a sheet glass and an organic resin film are laminated and attached with a first adhesive resin layer mainly containing a PVB resin on the sheet glass side and a second adhesive resin layer mainly containing an ethylene-vinyl acetate copolymer resin on the organic resin film side. Further, Patent Document 4 discloses a laminate which can be preferably used as glass for windows and doors of buildings and window glass for vehicles, and which is light-weight and is excellent in heat insulation and safety. In this laminate, a sheet glass is joined with an acrylic resin surface via a polyvinyl butyral resin.

Patent Document 1: JP 2006-96612 A
Patent Document 2: JP 2002-87849 A
Patent Document 3: JP 2003-176159 A
Patent Document 4: JP 6-99547 A

SUMMARY OF THE INVENTION

Problem to be Solved by the Invention

The above-mentioned conventional laminated sheet glass has a structure with a rigidity higher than that of an ordinary window sheet glass having a single structure, and hence the conventional laminated sheet glass gives larger shock to a human body when bumping against it, or the like. Further, it has been difficult to avoid injuries such as a cut wound to a human body because sharp glass pieces are generated when a sheet glass itself is broken. Further, the front and back light-transmitting surfaces of a laminated glass generally consist of formed of glass surfaces in most cases. Therefore, there is a fear in that fine scratches may be developed on the surface with the passage of time similarly to a single sheet glass, and that the strength may decrease with the passage of time depending upon the use.

On the other hand, as can be understood from the nationwide spread of the recent living environment having a barrier-free structure, there is a demand of this era that living environment enabling even elderly people and disabled people to lead daily lives safely is realized. Under such a circumstance, the demand from consumers for environment and living space in which people can live more safely is further increasing, and there is a demand for a laminated glass for windows that can be used more safely in constructing such living environment.

Further, a sheet glass is a material useful as a showcase. In this use, the sheet glass plays a role as a wall material that prevents the contact with contents, and has not only transparency that does not impair the beauty of the contents but also the strength withstanding daily contact. Therefore, in a general showcase, a single sheet glass for windows with a thickness of about 10 mm is used. One of the reasons that the sheet glass is appreciated as a window material for a showcase is scratch resistance higher than that of a sheet made of a resin such as polycarbonate that is a transparent material. On the other hand, recently, the awareness of crime prevention has been raised, and various security mechanisms including a security system have been developed. A single sheet glass that has a thickness several times that of a general window is not likely to be cracked during ordinary uses such as the display and inspection of contents. However, in terms of crime prevention, there are few reliable points other than the point that a sound is uttered during destruction. In an ordinary building, once the break-in of a thief is allowed in a chamber in which a showcase is present, a window material is cracked easily with an ordinary instrument such as a hammer and a bar, and there is a danger in that the contact and take-out of contents are allowed easily. Thus, there is a strong demand for a window material having a crime prevention property in addition to having properties suitable for a showcase.

An object of the present invention is to provide a laminated glass for windows having sufficient rigidity while having not only a high light-transmitting property but also excellent thermal shock resistance, penetration resistance, and airtightness, and in particular, a laminated glass for windows suitable for a showcase requiring crime prevention.

Means for Solving the Problems

Specifically, a laminated glass for windows of the present invention includes a laminate in which plural sheets of glass are laminated via a resin layer, wherein at least one of the sheet glasses placed at front and back light-transmitting surfaces is made of an alkali-free borosilicate glass, and a thickness of each of the sheet glasses is 1 mm or less, and a total thickness of plural sheets of glass is 2 to 10 mm.

In the present invention, an alkali-free borosilicate glass refers to glass that does not substantially contain an alkali metal element and has a glass composition in which the total of contents of a boron oxide ($B_2O_3$) and a silicon oxide ($SiO_2$) is 60% or more expressed in terms of oxides by mass %.

Herein, the term "substantially" means that, in a glass production process, glass may contain a trace amount of an alkali metal element that is mixed in glass inevitably from refractory materials and impurities in a glass material that come into contact with molten glass, for example, an alkali metal element in an amount of less than 1% expressed in terms of oxides by mass %.

It is important to set the thickness of each sheet glass to be 1 mm or less so that the glass absorbs elastically the external force applied to a light-transmitting surface of a laminated glass, for example, a mechanical shock force. In order to realize higher external force absorbing performance, the thickness of each sheet glass is set to be preferably less than 1 mm, more preferably 0.9 mm or less, and much more preferably 0.8 mm or less.

In the present invention, a resin forming a resin layer is not particularly limited in terms of its kind as long as it has an adhesive strength capable of binding sheet glasses to each other with a predetermined strength and is excellent in transmission performance with respect to visible light and chemical durability. The resin forming a resin layer is not necessarily one kind, and plural kinds of resins can be mixed, if required. Further, each resin layer may be one layer or may be formed of two or more layers made of different resin materials. In the case where each resin layer is made of the two or more layers, the thickness of each layer may or may not be the same.

A method of laminating plural sheets of glass via a resin layer is not particularly limited, and examples of the method include a method of injecting a liquid resin between adjacent sheet glasses and curing the resin, and a method of performing pressing and heating treatment under a condition that a film-shaped resin is sandwiched between the sheet glasses.

The composition of an alkali-free borosilicate glass applied to at least one of the sheet glasses placed at the front and back light-transmitting surfaces is not limited as long as the composition is capable of obtaining desired mechanical properties, weather resistance, surface smoothness, and the like of a sheet glass. For example, the composition of the alkali-free borosilicate glass contains 60% or more of $SiO_2$+$B_2O_3$ and 1% or less of $Na_2O$+$K_2O$+$Li_2O$, preferably 1 to 25% of $Al_2O_3$ and 2 to 30% of RO (R=Mg+Ca+Sr+Ba+Zn) expressed in terms of oxides by mass %. Further, in terms of facilitating the stable control of production conditions in a suitable range, the composition preferably contains 60 to 80% of $SiO_2$+$B_2O_3$ and 5 to 20% of $Al_2O_3$ in the above composition range. As glass having such a glass composition, for example, there is a thin sheet glass (Article code: OA-10, OA-21) to be mounted on a liquid crystal display device produced by Nippon Electric Glass Co., Ltd.

The other of the sheet glasses placed at the front and back light-transmitting surfaces may consist of the alkali-free borosilicate glass or may consist of other glasses, for example, various kinds of inorganic sheet glasses such as an alkali-free glass, an alkali-free borosilicate glass having a different glass composition from that of the above alkali-free borosilicate glass or alkali-free aluminoborosilicate glass, a borosilicate glass, a quartz glass, a crystallized glass, a color glass, a chemically strengthened glass, a physically strengthened glass, a sintered glass, a soda lime glass, a lead glass, a lead-free glass, a green glass, and a wired glass as long as a desired property can be secured. In addition, when three or more sheet glasses are laminated, the above matter is applied to a sheet glass placed at an intermediate layer.

According to the study by the inventors of the present invention, due to the above-mentioned configuration, even when a human body and a part thereof directly bump against the light-transmitting surface of a laminated glass for windows, the shock given to the human body can be reduced, and the light-transmitting surface is unlikely to be scratched even if bumping repeatedly occurs. This property is particularly remarkable in the case of applying a sheet glass with an alkali-free borosilicate glass to a light-transmitting surface of a laminated glass for windows. In an alkali-free glass containing a single component such as quartz glass and a borosilicate glass containing an alkali component such as Pyrex (Registered Trademark), such a property can not be obtained. Further, particularly, in the case of considering the chemical durability such as weather resistance and the homogeneity of glass to be obtained during the glass production, in addition to the above property, it is preferred to adopt an alkali-free aluminoborosilicate glass. The glass composition containing an aluminum component can facilitate the dissolution of a glass material during melting, make it easy to enhance the homogeneity of glass, and enhance the weather resistance of the surface of the glass to be obtained. Further, scratch resistance of the glass surface is enhanced as the homogeneity is higher.

Effects of the Invention

The laminated glass for windows of the present invention has the above structure. Therefore, even when a human body, an animal, or a thing that is being carried bumps against the laminated glass for windows carelessly, the glass will not be broken easily. Further, the shock is alleviated by the absorption action of the glass of the laminated glass for windows, and hence the shock given to a human body is reduced and the possibility of injuries is reduced. Further, the glass itself is not broken by virtue of the absorption of shock, and hence an injury such as a cut wound to a human body is unlikely to occur. Further, a scratch is unlikely to be caused by an ordinary contact, and hence a beautiful appearance can be maintained, and breakage strength is unlikely to decrease even if the laminated glass is used for a long period of time.

DETAILED DESCRIPTION OF THE INVENTION

In the laminated glass for windows of the present invention, it is preferred that the resin layer be made of a thermoplastic resin and its thickness be 0.1 to 2 mm in addition to the above structure, because higher shock absorbing performance can be exhibited. Here, 0.1 to 2 mm is the thickness of each resin layer interposed between adjacent sheet glasses.

The thickness of each sheet glass and each resin layer in a laminated glass for windows can be obtained by measuring the thicknesses at 5 or more points using, for example, a measuring appliance such as a vernier caliper, a laser measuring machine, and a microscope and averaging the measured values.

In the case where the thickness of each resin layer is less than 0.1 mm, the variation is likely to be caused in performance for fixing sheet glasses to each other in addition to the decrease in shock absorbing ability. In this case, a problem is likely to arise in that peeling occurs on an interface between the sheet glass and the resin layer, for instance. On the other hand, when the thickness of the resin layer exceeds 2 mm, the rigidity as a laminated glass for windows may be decreased.

There is no particular limit to the thermoplastic resin forming a resin layer, as long as it has desired performance and can provide an optically high transmittance in the case of being laminated with a sheet glass. For example, as the thermoplastic resin forming a resin layer, polyethylene (PE), an ethylene-vinyl acetate copolymer (EVA), polypropylene (PP), polystyrene (PS), a methacrylic resin (PMA), polyvinyl chloride (PVC), polyethylene terephthalate (PET), polybutylene terephthalate (PBT), cellulose acetate (CA), a diallyl phthalate resin (DAP), a urea resin (UP), a melamine resin (MF), an unsaturated polyester (UP), polyvinyl butyral (PVB), polyvinyl formal (PVF), polyvinyl alcohol (PVAL), a vinyl acetate resin (PVAc), an ionomer (IO), polymethyl pentene (TPX), vinylidene chloride (PVDC), polysulfone (PSF), polyvinylidene fluoride (PVDF), a methacryl-styrene copolymer resin (MS), polyarylate (PAR), polyarylsulfone (PASF), polybutadiene (BR), polyether sulfone (PESF), or polyether ether ketone (PEEK) can be used. Of those, as a preferable resin to be combined with the alkali-free borosilicate glass, an ethylene vinylacetate copolymer (EVA) and polyvinyl butyral (PVB) are exemplified.

An additive transmitting visible light may be added to a resin forming a resin layer. Examples of the additive include glass with a refractive index and a dispersion adjusted suitably and crystallized glass.

Further, if a colorant, and an absorbing agent absorbing light with a particular wavelength such as infrared light and UV-light are compounded in appropriate amounts with the resin forming a resin layer, additional performance can be provided. For the same reason, various additives and agents such as an antioxidant, a plasticizer, an antifoaming agent, a thickener, a paint modifier, and an antistatic agent, and the like can also be compounded in appropriate amounts.

In the laminated glass for windows of the present invention, if the sheet glass has a crack resistivity measured by a Vickers hardness test of 5 times or more of that of soda lime silica glass, in addition to the above, there is a decreased possibility that a laminated glass for windows is broken due to scratches and the like generated on the surface of the sheet glass.

Here, the above-mentioned crack resistivity can be evaluated by measuring the number of cracks developed from an indenter mark in the Vickers hardness test. The crack resistivity is used as an index indicating the difficulty in generating cracks on the surface of glass, and is also called a crack resistance. A method of measuring the crack resistivity (crack resistance) is based on a method proposed by Wada et al. (M. Wada et al. Proc., the Xth ICG, vol. 11, Ceram. Soc., Japan, Kyoto, 1974, p. 39).

The crack resistivity (crack resistance) is measured in an atmosphere of air at a temperature of 25° C. and a relative humidity of 30%. In the measurement, a clean light-transmitting surface of a sheet glass is placed horizontally on a sample stage of a Vickers hardness tester, and a Vickers indenter having a diamond-shaped horizontal cross-sectional outer appearance is lowered under various loads (Vickers indenter: a diamond-shaped pyramid indenter with an angle between the opposite faces of 136°). After the indenter is pressed against the glass surface for 15 seconds, the load is removed and an indenter mark formed on the glass surface is observed. The number of cracks developed from four corners of the indenter mark is checked, the ratio of the number of cracks thus checked to the number (four) of cracks that can be generated at maximum from one indenter mark is calculated to obtain a crack occurrence ratio. A series of test procedures is conducted repeatedly using 20 test bodies for one load condition. The test results are shown in a graph of a load value and a crack occurrence ratio together with the test results of various loads. Then, a load value corresponding to a 50% crack occurrence ratio is obtained from an approximate curve of the graph. Then, the load value corresponding to the 50% crack occurrence ratio is a crack resistivity ($R_{50}$). As the crack resistivity ($R_{50}$) has a larger value, cracks on the glass surface are more unlikely to be generated. In the laminated glass for windows of the invention of the present application, the crack resistivity ($R_{50}$) is a value that is 5 times or more that of soda lime silica glass.

When the crack resistivity is less than 5 times that of soda lime silica glass, the laminated glass may not withstand the use over a long period of time even if an initial strength is sufficiently high.

The crack resistivity is determined by the structure of glass. The magnitude of the crack resistivity depends upon the coarse/dense property of a network structure caused by components forming a glass structure and the ease of sliding of a network structure when an external force is applied to the glass. Regarding the influence of a glass component on the coarse/dense property of a network structure, when the amounts of an alkali oxide and an alkaline-earth oxide are large, the gap present in the network structure of glass decreases. General glass containing silica contains a large amount of components such as sodium oxide and calcium oxide, and hence the glass structure is dense to some degree. On the other hand, when the concentrations of components such as aluminum oxide and boron oxide, as the components added to silicate glass, are high, the network structure of glass is a structure with increased gaps. The gaps in the network structure have a buffer function of absorbing deformation when an external force is applied. Therefore, in glass including a large number of gaps in the glass network structure, the bond is unlikely to be cut even when an external force is applied, and cracks are unlikely to be generated by a Vickers indenter. Further, in glass containing a boron oxide component, the triangle structure of boron oxide moves due to sliding, and hence the external force is easily let out by virtue of plastic flow. On the other hand, in silica glass formed of only a silica component, a tetrahedron structure of silica has a three-dimensional arrangement, and hence the plastic flow is substantially impossible. For those reasons, in borosilicate glass, and in alkali-free borosilicate glass, the network structure of glass is unlikely to be cut due to an external force, and a crack resistivity is high.

As described above, when the crack resistivity is 5 times or more that of soda lime silica glass, an abrasion mark is unlikely to be formed on a glass surface over a long period of time, and hence a phenomenon of the breakage of a sheet glass caused by the abrasion mark is unlikely to occur easily, and excellent durability can be maintained continuously. Simultaneously, there is also effective against the decrease in beauty by virtue of the prevention of occurrence of scratches. Further, a scratch is unlikely to be developed compared with a single sheet glass for windows used generally, and in addition a remarkable crime-preventing property is ensured even with respect to the crushing, by virtue of the shock absorption (and penetration resistance). Because of those features, the laminated glass for windows of the present invention exhibits excellent performance particularly as a window member for a showcase requiring crime prevention, in addition to a long-term beauty keeping property.

The laminated glass for windows of the present invention has a light-transmitting surface in a substantially rectangular (square or rectangular) shape. It is preferred that the laminated glass be set so that the lowest end of the light-transmitting surface is positioned within 2,000 mm from a floor surface of a building, because effective defense performance can be exhibited with respect to various bumping phenomena to a glass light-transmitting surface under a living environment.

For example, in the case of setting the laminated glass of the present invention as a window member for lighting on the side surface of indoor/outdoor stairs and the side surface of an escalator, etc. the maximum value of the distance between the lowest end of the light-transmitting surface and each stairs and an escalator, etc. preferably be 2,000 mm or less.

It is preferred that the laminated glass for windows of the present invention have a side dimension of a light-transmitting surface (short side dimension in the case where a light-transmitting surface is a rectangle), which is within a range of 300 to 1,500 mm, because the laminated glass can be used as a window member for various buildings and constructions.

It is preferred that the laminated glass for windows of the present invention be such that, in a ball drop test (a rigid sphere drop test) according to JIS R3205, the recoil height is 300 mm or more when a steel ball of 1.0 kg according to JIS B1501 is dropped from a height of 2,400 mm, or the recoil height is 1,000 mm or more when a steel ball of 2.3 kg according to JIS B1501 is dropped from a height of 4,800 mm, because the laminated glass has high flexibility and is not broken easily, and hence, excellent shock absorbing ability can be realized.

Here, the above-mentioned recoil height refers to the maximum height when the steel ball is dropped to the laminated glass for windows under the above condition. For measuring such a recoil height, a height measuring appliance such as a measuring tape and a laser measuring machine can be used. When a video camera is used, the recoil height and the recoil behavior can be checked in detail.

A glass window member can be formed of the laminated glass for windows of the present invention and support members provided at ends of the laminated glass for windows. The support members are respectively provided, for example, at ends of the laminated glass for windows facing each other. The ends facing each other in a horizontal direction of the laminated glass for windows may be supported respectively by the support members, and at least lower end of the ends facing each other in a vertical direction may be supported by the support member. Further, the laminated glass for windows may be supported by a frame-type support member (window frame).

The above-mentioned support member can be produced using at least one material selected from the group consisting of plastic, rubber, rock, metal, glass, glass ceramics, and wood. For example, as the material for the above-mentioned support member, plastic such as a resin or FRP, natural or chemically synthetic rubber, natural or artificial rock, metal such as aluminum or an ion alloy, and glass such as glass fibers or powder glass, glass ceramics, and natural or synthetic wood can be used.

The glass window member of the present invention can be finely adjusted in optical performance and mechanical performance by applying coating onto at least one of the front and back light-transmitting surfaces.

Examples of the above-mentioned coating include an anti-reflection film (which is also called an AR coat), an infrared reflection film (or an infrared cut filter), a non-reflection film, a conductive film, an antistatic film, a low-pass filter, a high-pass filter, a band-pass filter, a shield film, a reinforced film, and a protective film. When coating films are formed respectively on the front and back light-transmitting surfaces, the coating films on both of the light-transmitting surfaces may or may not be of the same kind. Further, the above-mentioned coating film may have a multi-layered structure of plural film layers having the same or different functions.

As a material for the coating film, for example, there can be used a material having a composition of silica ($SiO_2$), alumina ($Al_2O_3$), zirconia ($ZrO_2$), tantalum oxide (or tantala) ($Ta_2O_5$), niobium oxide ($Nb_2O_5$), lanthanum oxide ($La_2O_3$), yttrium oxide ($Y_2O_3$), magnesium oxide (MgO), hafnium oxide ($HfO_2$), chromium oxide ($Cr_2O_3$), magnesium fluoride ($MgF_2$), molybdenum oxide ($MoO_3$), tungsten oxide ($WO_3$), cerium oxide ($CeO_2$), vanadium oxide ($VO_2$), titanium zirconium oxide ($ZrTiO_4$), zinc sulfide (ZnS), cryolite ($Na_3AlF_6$), chiolite ($Na_5Al_3F_{14}$), yttrium fluoride ($YF_3$), calcium fluoride ($CaF_2$), aluminum fluoride ($AlF_3$), barium fluoride ($BaF_2$), lithium fluoride (LiF), lanthanum fluoride ($LaF_3$), gadolinium fluoride ($GdF_3$), dysprosium fluoride ($DyF_3$), lead fluoride ($PbF_3$), strontium fluoride ($SrF_2$), an antimony-containing tin oxide (ATO) membrane, an indium oxide-tin membrane (ITO membrane), a multilayer membrane of $SiO_2$ and $Al_2O_3$, an SiOx-TiOx-based multilayer membrane, an $SiO_2$—$Ta_2O_5$-based multilayer membrane, an SiOx-LaOx-TiOx-based multilayer membrane, an $In_2O_3$—$Y_2O_3$ solid solution membrane, an alumina solid solution membrane, a metal thin membrane, a colloid particle-dispersed membrane, a polymethyl methacrylate membrane (PMMA membrane), a polycarbonate membrane (PC membrane), a polystyrene membrane, a methyl methacrylate-styrene copolymer membrane, a polyacrylate membrane, and the like.

As a method of the coating, various methods can be employed as long as desired surface state and function can be realized and the required cost can be acceptable. For example, a sputtering method, chemical vapor phase growth methods (or CVD methods) such as a vacuum vapor deposition method, a thermal CVD method, a laser CVD method, a plasma CVD method, a molecular beam epitaxy method (MBE method), an ion plating method, a laser abrasion method, and an organic metal chemical vapor phase growth method (MOCVD), and liquid phase growth methods such as a sol-gel method, a spin coating method, a coating method of a screen printing, and a plating method can be employed. Of those, the CVD method is preferred because good adhesion can be easily attained in coating even at a low temperature and because that method is applicable to various coating films such as compound films.

Further, a surface protective film such as a resin film may be provided on the entire surface or partial surface of the laminated glass for windows.

EXAMPLE 1

FIG. 1 is a partial cross-sectional view of a laminated glass for windows according to an example. The laminated glass for windows 10 has a multi-layered structure in which plural sheets of glass 20 are laminated via a resin layer 30. The thickness of each sheet glass 20 is 0.7 mm, and the total thickness of the entire sheet glasses 20 (3 sheets in this example) is 2.1 mm. Further, each sheet glass 20 is formed of an alkali-free borosilicate glass, in particular, an alkali-free aluminoborosilicate glass, and the composition thereof is 60% or more of $SiO_2+B_2O_3$, 5 to 20% of $Al_2O_3$, 2 to 30% of RO (R=Mg+Ca+Sr+Ba+Zn), and 1% or less of $Na_2O+K_2O+Li_2O$ expressed in terms of oxide by mass %. The resin layers 30 are interposed between the adjacent sheet glasses 20, and the thickness of each resin layer 30 is 0.3 mm. In this example, the resin layer 30 is made of an ethylene vinyl acetate copolymer (EVA).

FIG. 2 shows a glass window member 50 using the laminated glass for windows 10 in FIG. 1. A light-transmitting surface 20a of the laminated glass for windows 10 has a rectangular shape with a short side being 800 mm, and four corners rounded with a radius of 30 mm. The glass window member 50 is, for example, used as a window for lighting and ventilation of a lobby on the 1st floor in a condominium, and is set so that the lowest end (long side) of the light-transmitting surface 20a is positioned at a height of 100 mm from the floor surface.

Both side ends of the laminated glass for windows 10 are provided with support members 51 made of aluminum, respectively. Each of the support members 51 includes a substantially U-shaped mounting portion 51b and a shaft portion 51a provided on the outer surface side of a base of the mounting portion 51b, and both sides of the mounting portion 51b sandwiches the side ends of the laminated glass for windows 10. For example, the mounting portion 51b is mounted on the side ends of the laminated glass for windows 10, and thereafter, both the side ends of the mounting portion 51b is fixed with pinching onto the respective light-transmitting surfaces 20a, whereby the support member 51 is fixed to the side ends. Thus, the side ends of the laminated glass for windows 10 are sandwiched by the support member 51 while being supplied with a compression stress in a thickness direction. The laminated glass for windows 50 is attached rotatably to a receiving jig provided in an opening of a wall surface (not shown) with the shaft portion 51a of the support member 51 being a rotation shaft. Such a structure is useful for maintaining and managing the living environment of a condominium comfortably, because it is capable of removing moisture and dust in addition to the provision of lighting.

FIG. 3 shows another glass window member 60 using the laminated glass for windows 10 in FIG. 1. The glass window member 60 includes a support member in a window frame shape, for example, a frame 61 made of aluminum, and is set in the case where ventilation and the like are not required. Specifically, the laminated glass for windows 10 is fixed in a groove (not shown) provided on a mortar wall surface or the like. The frame 61 as a support member includes a mounting groove 30 in a substantially U-shape in a cross-section, and the laminated glass for windows 10 is mounted on the mounting groove 30 to be held. Here, although the frame 61 made of aluminum is used, a wood frame, a hard rubber frame, a glass frame, a glass ceramics frame, a rock frame, or a frame made of FRP may be used, and the construction incorporating a design in accordance with a living environment can be adopted.

The glass window members 50, 60 are, for example, set so as to be placed below the waist at a place where people come and go such as a lobby on the 1st floor of a condominium. Therefore, the light-transmitting surface 20a of the laminated glass for windows 10 is in an environment which is likely to be scratched and the like; however, scratches to be the factors of damages are unlikely to be generated and the decrease in strength is unlikely to occur over the used for a long period of time, because the thin sheet glass 20 made of an alkali-free borosilicate glass is adopted. Further, in such a setting place, the light-transmitting surface 20a may be accidentally kicked by a foot during walking. However, the laminated glass for windows 10 will not be broken even when receiving such a shock from a human body, and is also safe for a human body because injuries such as bruise are unlikely to occur.

In this was, the laminated glass for windows 10 according to the example exhibits excellent performance with respect to the shock caused by a human body and the like. Therefore, the laminated glass for windows 10 has high utility value particularly for including a place and a facility strongly requiring safety, public buildings such as a hotel, a restaurant, a hospital, a school, and a station premise, and a welfare-related building such as a home for elderly people and a nursing home as well as general residences.

EXAMPLE 2

The performance evaluation test conducted with respect to the laminated glass for windows and the obtained results are described.

First, sheet glasses (sheet thickness: 0.7 mm and sheet thickness: 0.5 mm) with a predetermined dimension, made of an OA-10 material manufactured by Nippon Electric Glass Co., Ltd. were prepared, and laminated with a resin having a predetermined thickness of a vinyl ethylene acetate copolymer (EVA) or polyvinyl butyral (PVB) sandwiched therebetween. As the sheet glass of the OA-10 material, a recycled product of a sheet glass that has been assembled once as a liquid crystal display device can also be used. In this recycling, it is necessary to remove dust and attached substances on the surface during the cleaning step. In the case of newly producing a sheet glass of the OA-10 material, it is necessary to obtain a sheet glass with a high size precision by molding such as an overflow downdraw method through the mixing of materials, melting, and homogenization.

Next, the measurement of a Young's modulus of a laminated glass for windows will be described. The measurement is conducted using a 3-point bending test device. In the current evaluation, as the 3-point bending test device, a strength testing machine manufactured by Shimazdu Corporation was used. As the measurement conditions, the environment under a normal pressure and temperature, a distance between supporting points of 120 mm, and a cross-head speed of 0.5 mm/min. were adopted.

Table 1 shows the measurement results of the Young's modulus. In Table 1, regarding each sample, the thickness of a single sheet glass (thickness of one sheet), the number of laminated sheets (number of layers), total thickness (total thickness dimension), material for a resin layer, the thickness of each resin layer (thickness of one layer), and the number of layers are shown. As the examples, the results of 14 test bodies in total including sample Nos. 1 to 14 are shown. As the comparative examples, the results of 3 test bodies in total including sample Nos. 101 to 103 are shown.

TABLE 1

|  |  | Example | | | | | | | | | | |
|---|---|---|---|---|---|---|---|---|---|---|---|---|
| | Sample No. | 1 | 2 | 3 | 4 | 5 | 6 | 7 | 8 | 9 | 10 | 11 |
| Sheet glass | Material | OA-10 | OA-10 | OA-10 | OA-10 | OA-10 | OA-10 | OA-10 | OA-10 | OA-10 | OA-10 | OA-10 |
| | Thickness of one sheet (mm) | 0.7 | 0.7 | 0.7 | 0.7 | 0.7 | 0.7 | 0.7 | 0.7 | 0.7 | 0.5 | 0.5 |
| | Number of layers | 4 | 5 | 5 | 4 | 5 | 6 | 4 | 5 | 6 | 10 | 9 |

TABLE 1-continued

|  |  | | | | | | | | | | | |
|---|---|---|---|---|---|---|---|---|---|---|---|---|
|  | Total thickness dimension (mm) | 2.3 | 3.5 | 4.2 | 2.3 | 3.5 | 42 | 2.8 | 35 | 4.2 | 5.0 | 45 |
| Resin layer | Material for resin layer | PVB | PVB | PVB | PVB | PVB | PVB | EVA | EVA | EVA | EVA | PVB |
|  | Thickness of one layer (mm) | 0.1 | 0.4 | 0.4 | 0.3 | 0.8 | 0.8 | 0.3 | 0.3 | 0.3 | 0.3 | 0.4 |
|  | Number of layers | 3 | 4 | 5 | 8 | 2 | 5 | 3 | 4 | 5 | 9 | 8 |
| Young's modulus (Gpa) | | 6 | 3 | 2 | 2 | 1 | 1 | 17 | 13 | 9 | 2 | 1 |

|  |  | Example | | | Comparative Example | | |
|---|---|---|---|---|---|---|---|
|  | Sample No. | 12 | 13 | 14 | 101 | 102 | 103 |
| Sheet glass | Material | OA-10 | OA-10 | OA-10 | SLS sheet | SLS sheet | OA-10 |
|  | Thickness of one sheet (mm) | 0.5 | 0.7 | 0.7 | 30 | 3.0 | 0.7 |
|  | Number of layers | 7 | 6 | 2 | 1 | 2 | 6 |
|  | Total thickness dimension (mm) | 3.5 | 42 | 28 | 30 | 6.0 | 4.2 |
| Resin layer | Material for resin layer | PVB | PVB | PVB | None | PVB | PVB |
|  | Thickness of one layer (mm) | 0.3 0.4 | 0.8 0.4 0.4 | 0.8 0.4 | None | 0.5 | 0.1 |
|  | Number of layers | 6 | 2 1(Intermediate layer) 2 | 1 (Intermediate layer) 1 | None | 1 | 5 |
| Young's modulus (Gpa) | | 0.5 | 2 | 3 | 52 | 7 | 56 |

SLS: Soda-Lime-Silica glass

Further, in order to evaluate the shock absorbing ability of the laminated glass for windows, a ball drop test according to JIS R3205 was conducted. A steel ball (diameter: 64 mm, mass: 1.0 kg, or diameter: 83 mm, mass: 2.3 kg) according to JIS B1501 was dropped onto a laminated glass for windows having a light-transmitting surface measuring 610 mm per side, and the recoil height was measured. The recoil height of the dropped steel ball was measured by visual inspection, and data on the height was also confirmed using a VTR. For conducting the test, the laminated glass for windows having a light-transmitting surface measuring 610 mm per side was fixed horizontally to a metal frame made of iron. The steel ball was held above a test body so as to be dropped to a position within a radius of 25 mm from the center of the light-transmitting surface measuring 610 mm per side of the laminated glass for windows, and was dropped freely, whereby the test was conducted. The metal frame made of iron has an external size of 600 mm per side, an internal size of 570 mm per side, and a height of 150 mm, and an iron plate measuring 660 mm per side was welded to a bottom surface. The metal frame made of iron was placed on a rubber sheet with a thickness of 3 mm on a horizontal floor surface. Under these conditions, the shock absorbing ability was evaluated.

The ball drop test was conducted by dropping a steel ball of 1.0 kg from heights of 50 cm, 80 cm, 100 cm, 120 cm, 150 cm, 190 cm, 240 cm, 300 cm, 380 cm, and 480 cm. In the case where the ball did not pass through the laminated glass for windows by the dropping of the steel ball of 1.0 kg, a ball drop test using a steel ball of 2.3 kg was followed to be done.

Table 2 shows the evaluation results of the ball drop test. In Table 2, regarding each sample, the thickness of a single sheet glass (thickness of one sheet), the number of laminated sheets (number of layers), the total thickness (total thickness dimension), material for a resin layer, the thickness of each resin layer (thickness of one layer), and the number of layers are shown. As the examples, the results of test bodies including sample Nos. 15 and 16 are shown. As the comparative examples, the results of sample Nos. 102 and 104 are shown.

TABLE 2

|  |  | Example | | Comparative Example | |
|---|---|---|---|---|---|
|  | Sample No. | 15 | 16 | 102 | 104 |
| Sheet glass | Material | OA-10 | OA-10 | SLS sheet | SLS sheet | Chemically reinforced sheet |
|  | Thickness of one sheet (mm) | 0.7 | 0.7 | 3.0 | 3.0 | 7.0 |
|  | Number of layers | 6 | 8 | 2 | 1 | 1 |
|  | Total thickness (mm) | 4.2 | 5.6 | 6.0 | | 10.0 |

TABLE 2-continued

|  |  | Example | | Comparative Example | |
|---|---|---|---|---|---|
| | Sample No. | 15 | 16 | 102 | 104 |
| Resin layer | Material for resin layer | PVB | EVA | PVB | PVB |
| | Thickness of one layer (mm) | 0.8 | 0.3 | 1.5 | 2.0 |
| | Number of layers | 5 | 7 | 1 | 1 |
| Ball drop test (recoil height) (cm) | Mass Of dropping ball (Kg) / Height of ball dropping (cm) | | | | |
| | 1.0 / 50 | 10 | 10 | 10 | 1 |
| | 1.0 / 80 | 15 | 15 | 10 | 2 |
| | 1.0 / 100 | 20 | 20 | 15 | 3 |
| | 1.0 / 120 | 30 | 25 | 20 | 5 |
| | 1.0 / 150 | 40 | 35 | Glass broken | 10 |
| | 1.0 / 190 | 50 | 40 | — | 10 |
| | 1.0 / 240 | 60 | 50 | — | 15 |
| | 1.0 / 300 | 80 | 70 | — | 25 |
| | 1.0 / 380 | 90 | 80 | — | 35 |
| | 1.0 / 480 | 100 | 80 | — | 45 |
| | 2.3 / 480 | 150 | 150 | — | 70 |

SLS: Soda-Lime-Silica glass

Further, regarding a sheet glass of an OA-10 material manufactured by Nippon Electric Glass Co., Ltd. used for a laminated glass for windows, the crack resistivity of a light-transmitting surface thereof was evaluated. A Vickers hardness tester was used for the evaluation. The tester used in this evaluation is a micro-hardness tester MTX-50 manufactured by Matsuzawa Co., Ltd., and has performance that can be used in a micro-hardness test JIS Z2251. The measurement was conducted in an atmosphere of air at a temperature of 25° C. and a relative humidity of 30%.

The crack resistivity is also called a crack resistance. In the measurement, a test body is placed on a test stage so that the glass surface becomes horizontal, and a Vickers indenter is pressed against the surface under various loads. The loads for pressing were 100 g, 500 g, 1,000 g, and 2,000 g, and the pressing time was set to be 15 seconds, respectively. The operation in the same procedure was conducted with respect to 20 test bodies under the same conditions. Regarding the diamond-shaped indenter mark remaining on the surface of the test body, the number of cracks generated from four corners was measured using a 10-fold stereoscopic microscope. In 20 test bodies, there were 80 indenter mark corners in total, and the number of crack occurrences was obtained with respect thereto and the crack occurrence ratio was obtained.

FIG. 4 shows a crack occurrence ratio obtained by the measurement under each load. A load value at which the crack occurrence ratio is 50% is read from FIG. 4 and set to be a crack resistivity ($R_{50}$). Table 3 shows the crack resistivity ($R_{50}$) of the test bodies. Herein, in addition to the above-mentioned OA-10, as the comparative examples, an ordinary borosilicate glass (Pyrex) and soda lime silica glass (abbreviated as a SLS sheet) used as a window sheet glass were also measured.

TABLE 3

| | Example glass material | Comparative glass material 1 | Comparative glass material 2 |
|---|---|---|---|
| Glass material | OA-10 | Pyrex | SLS sheet |
| Crack resistivity [$R_{50}$ value] (g) | 1,150 | 220 | 120 |

SLS: Soda-Lime-Silica glass

The above-mentioned series of evaluation results are summarized. It can be considered from the evaluation results of the Young's modulus in Table 1 that the laminated glasses for windows in the examples have a low Young's modulus of 20 GPa or lower, and thus, have a flexible structure. In the recoil height evaluation in the falling ball in Table 2, the steel ball of 1.0 kg that has been dropped from a height of 240 cm recoils to 50 to 60 cm, and the steel ball of 2.3 kg that has been dropped from a height of 480 cm recoils to 150 cm. This shows excellent performance to recoil a coming object. The crack resistivity ($R_{50}$) in Table 3 is a very high value exceeding 1,000 g, which is largely different from that of other glasses. This result shows the laminated glass for windows of the example exhibits high resistance performance with respect to scratches on the glass surface. These results will be summarized as follows. The laminated glass for windows of the example exhibits excellent performance of being unlikely to be broken by absorbing the applied shock, not giving serious damages to a bumping substance, and being unlikely to be scratched.

Figure 1:
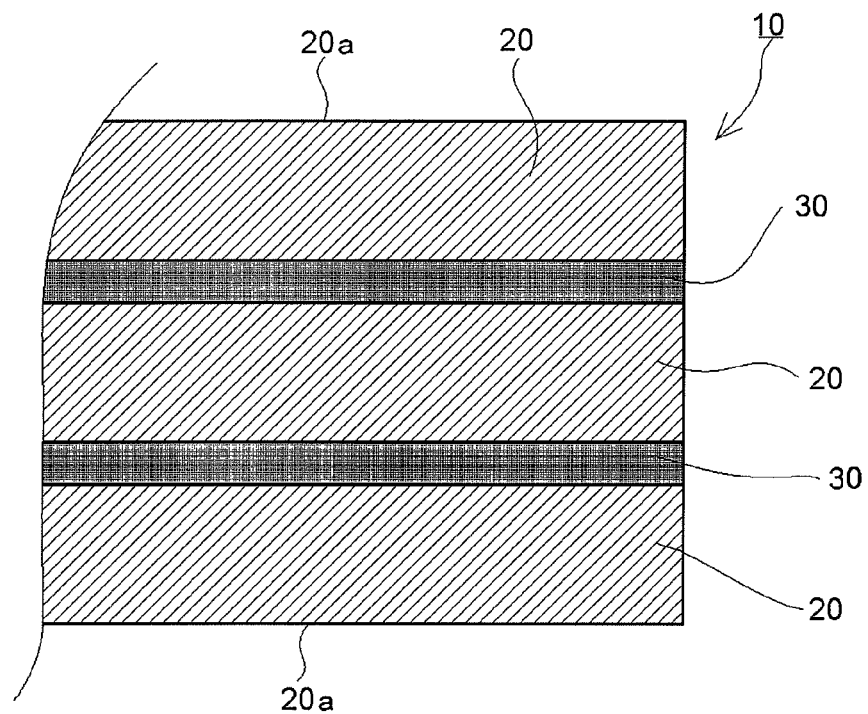
[FIG. 1] A partial cross-sectional view of a laminated glass for windows according to Example of the present invention.
Figure 2:
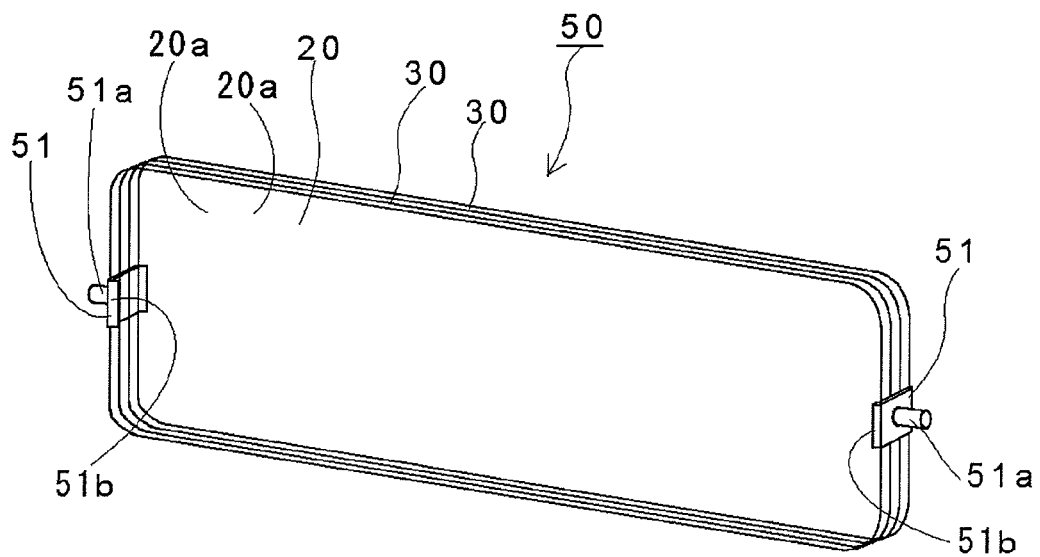
[FIG. 2] A perspective view of a glass window member according to Example of the present invention.
Figure 3:
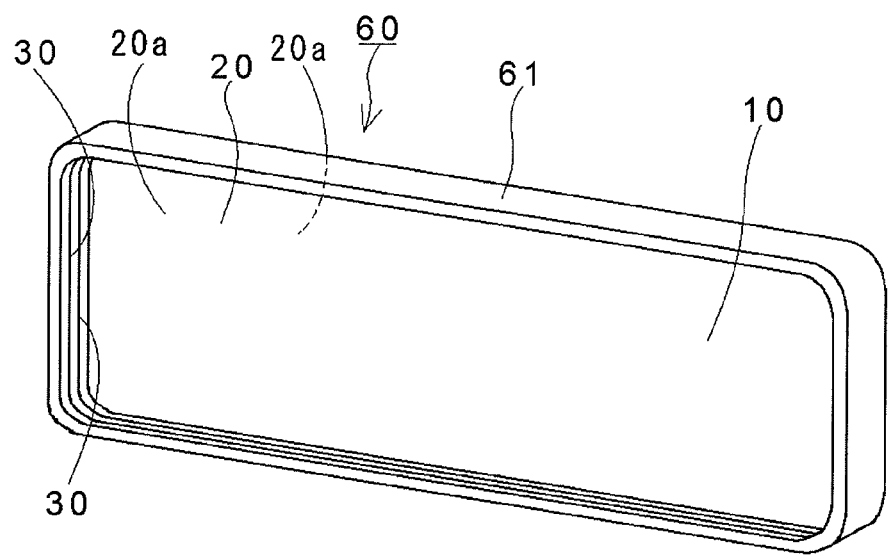
[FIG. 3] A perspective view of a glass window member of another mode according to Example of the present invention.
Figure 4:
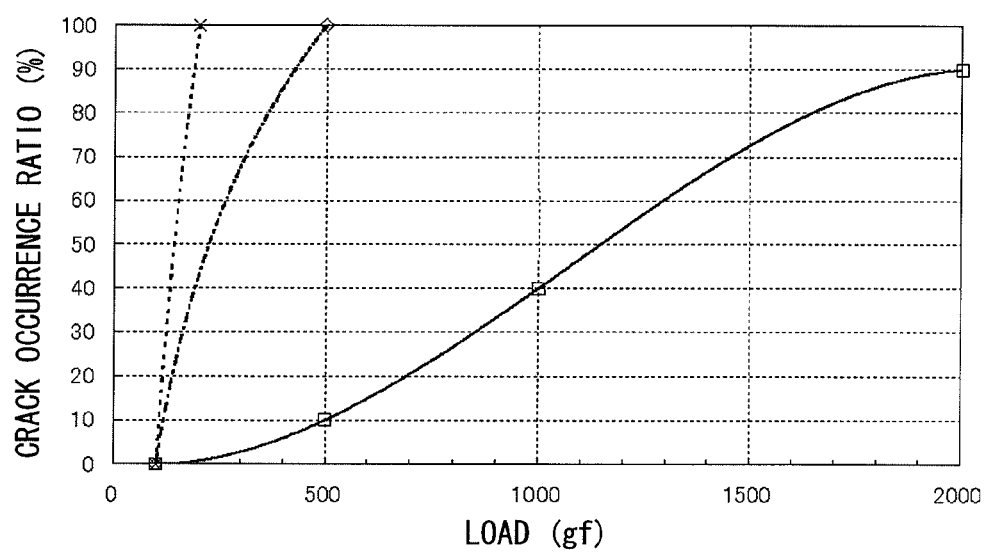
[FIG. 4] A graph illustrating a relationship between a load and a crack occurrence ratio.

| Description of Symbols | |
|---|---|
| 10 | laminated glass for windows |
| 20 | sheet glass |
| 20a | light-transmitting surface |
| 30 | resin layer |
| 50, 60 | glass window member |

The invention claimed is:
1. A laminated glass for windows comprising 3 to 10 glass sheets laminated via a resin layer, wherein two of the glass sheets constitute front and back surfaces of the laminated glass, respectively, and at least one of the glass sheets constituting the front and back surfaces of the laminated glass is made of an alkali-free borosilicate glass which comprises, expressed in terms of oxides by mass %, 60% or more of $SiO_2+B_2O_3$ and 1% or less of $Na_2O+K_2O+Li_2O$, wherein a thickness of each of the glass sheets is 1 mm or less, and a total thickness of a total number of the glass sheets is 2 to 10 mm, and wherein the laminated glass has a Young's modulus of 20 GPa or less.

2. The laminated glass for windows according to claim 1, wherein the resin layer is made of a thermoplastic resin, and has a thickness of 0.1 to 2 mm.

3. A glass window member, comprising:
the laminated glass for windows according to claim 1; and
a support member provided at an end of the laminated glass for windows.

4. The glass window member according to claim 3, wherein the support member comprises one or more materials selected from the group consisting of plastic, rubber, rock, metal, glass, glass ceramics, and woods.

5. The glass window member according to claim 3, further comprising a coating film formed on at least one of the front and back surfaces of the laminated glass for windows.

6. The glass window member according to claim 3, which is used as a window member for a showcase.

7. A glass window member, comprising:
the laminated glass for windows according to claim 2; and
a support member provided at an end of the laminated glass for windows.

8. The glass window member according to claim 4, further comprising a coating film formed on at least one of the front and back surfaces of the laminated glass for windows.

9. The glass window member according to claim 7, further comprising a coating film formed on at least one of the front and back surfaces of the laminated glass for windows.

10. The glass window member according to claim 4, which is used as a window member for a showcase.

11. The glass window member according to claim 5, which is used as a window member for a showcase.

12. The glass window member according to claim 7, which is used as a window member for a showcase.

13. The laminated glass for windows according to claim 1, wherein all of the glass sheets of the laminated glass are made of the alkali-free borosilicate glass.

* * * * *